(Model.)

E. J. MOORE.
Spring for Vehicles.

No. 237,040.   Patented Jan. 25, 1881.

WITNESSES:
Francis McArdle
C. Sedgwick

INVENTOR:
E. J. Moore
BY Munn & Co
ATTORNEYS.

UNITED STATES PATENT OFFICE.

ETHELBERT J. MOORE, OF VILLISCA, IOWA.

SPRING FOR VEHICLES.

SPECIFICATION forming part of Letters Patent No. 237,040, dated January 25, 1881.

Application filed October 21, 1880. (Model.)

*To all whom it may concern:*

Be it known that I, ETHELBERT JONES MOORE, of Villisca, Montgomery county, Iowa, have invented a new and useful Improvement in Concussion-Springs for Vehicles, of which the following is a specification.

Figure 1:
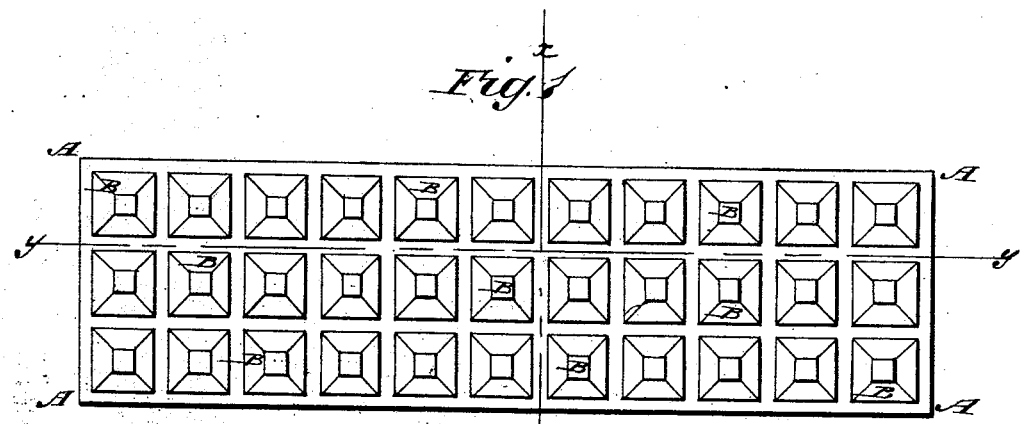
Figure 2:
Figure 3:
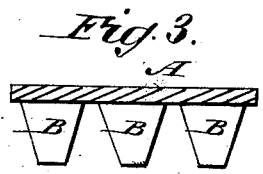

Figure 1 is a plan view of the improvement. Fig. 2 is a sectional side elevation taken through the line $y\,y$, Fig. 1; and Fig. 3 is a sectional end elevation taken through the line $x\,x$, Fig. 1.

Similar letters of reference indicate corresponding parts.

The object of this invention is to furnish concussion-springs for wagons and other vehicles used upon rough or uneven streets or other roadways, to prevent the vehicles from being broken or injured by jars or shocks.

The invention consists in constructing a concussion-spring for vehicles of a rubber plate having upon its face rubber blocks in the shape of truncated pyramids, so that the shock of a lighter or a heavier load will be sustained with equal effectiveness, as will be hereinafter fully described.

A represents a rubber plate of any desired length, breadth, and thickness as the size of the vehicle and weight to be carred by the said vehicle may require.

To the face of the rubber plate A are attached, or upon it are formed, rubber blocks B, made tapering or in the shape of truncated pyramids.

The plate A is designed to be attached to the axle or bolster of the vehicle, or to some other part, as the construction of the vehicle may render most desirable, to adapt the spring to receive the concussion.

By the use of this concussion-spring the box, body, or bed of the vehicle, and also the gearing, will be protected, and at the same time the noise made by the passing of the vehicle over a rough roadway will be deadened, so that annoyance from this cause will be removed.

When the concussion-springs A B are used upon the axles or bolsters of vehicles with the bodies or other loading resting upon them, they should be placed upon the said axles or bolsters with the blocks C downward.

With this construction the tapering form of the blocks B makes the concussion-springs equally effective, whether carrying a lighter or a heavier load, as a lighter load will be sustained by the elasticity of the smaller parts of the blocks B, and as the load is heavier the larger parts of the said blocks will exert their elasticity to sustain it.

I am aware that a rubber concussion-spring between the bolster and bed of a wagon is not, broadly, new; but

What I claim is—

A concussion or bolster spring consisting of the plate A with truncated pyramids B, both made of some elastic material, as shown and described.

ETHELBERT JONES MOORE.

Witnesses:
 J. KNOWLES,
 JAMES CUMMINGS.